J. F. WILLIAMS.
THERMOSTAT.
APPLICATION FILED APR. 17, 1908.
942,870.
Patented Dec. 7, 1909.
2 SHEETS—SHEET 2.
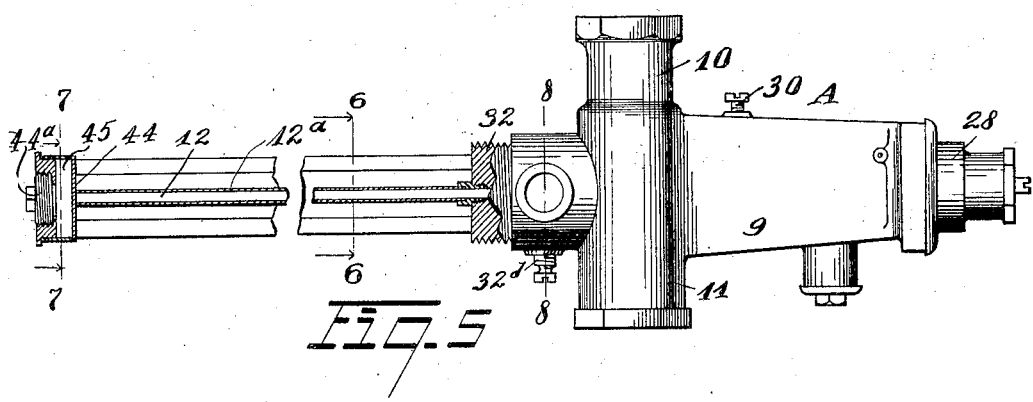
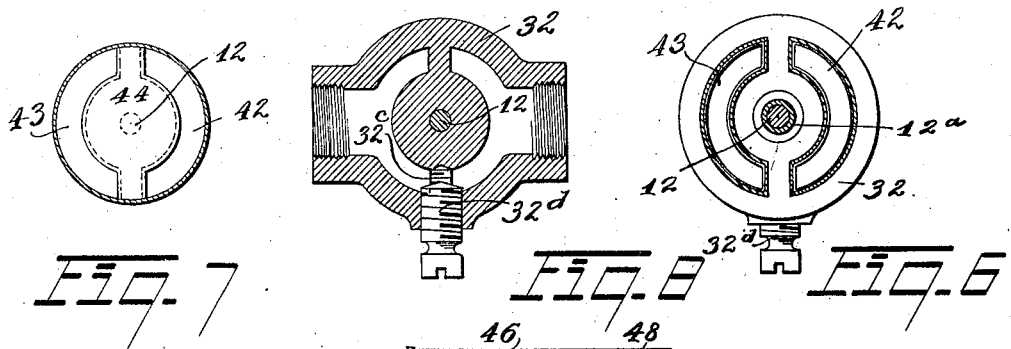
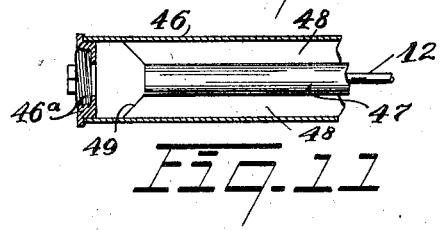
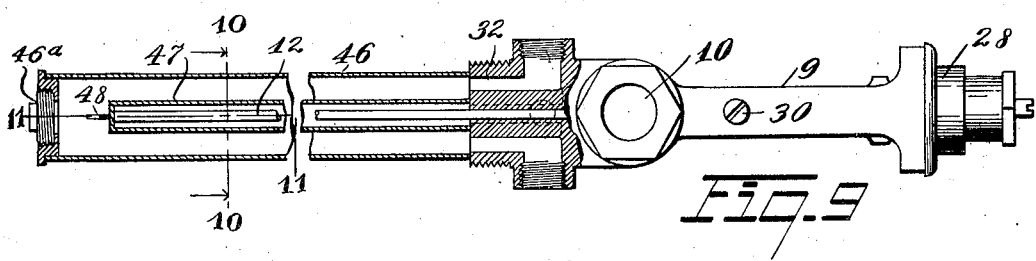
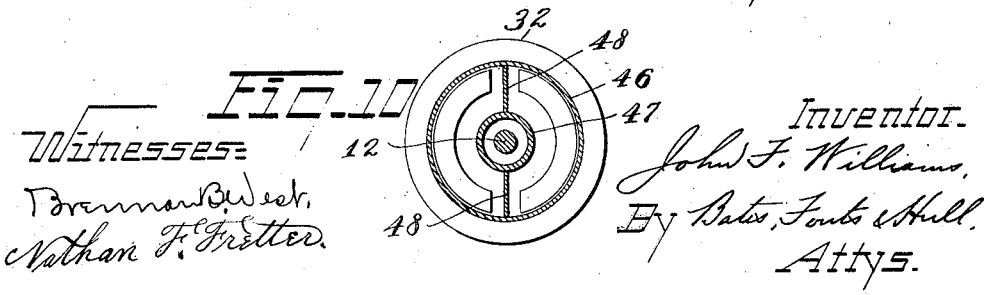
Witnesses:
Brennan B. West.
Nathan F. Fretter.
Inventor.
John F. Williams,
By Bates, Fouts & Hull.
Attys.

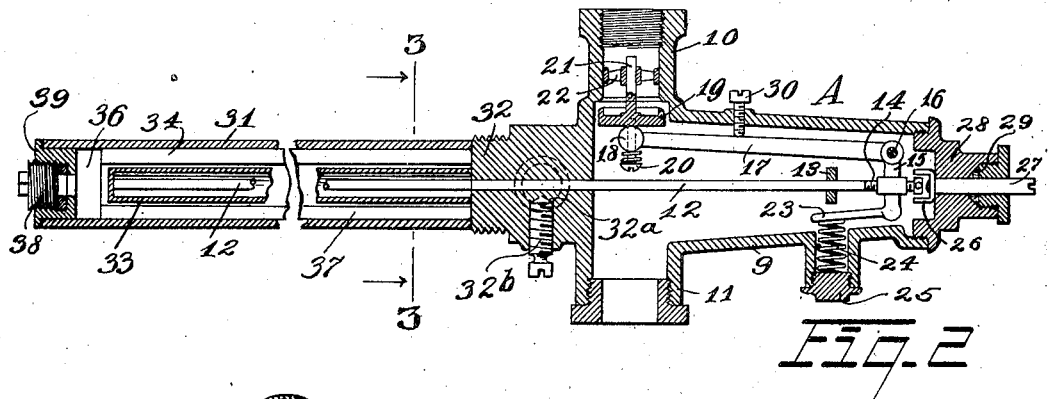
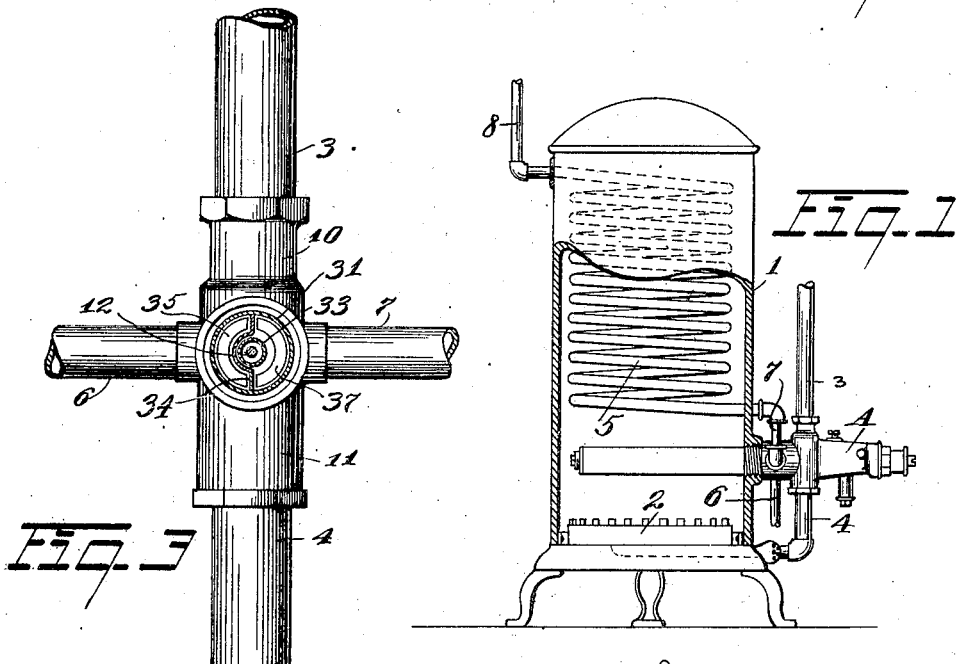
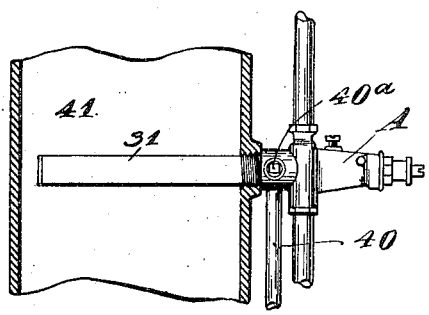

UNITED STATES PATENT OFFICE.

JOHN F. WILLIAMS, OF SANDUSKY, OHIO.

THERMOSTAT.

942,870.

Specification of Letters Patent.   Patented Dec. 7, 1909.

Application filed April 17, 1908. Serial No. 427,590.

*To all whom it may concern:*

Be it known that I, JOHN F. WILLIAMS, a citizen of the United States, residing at Sandusky, in the county of Erie and State of Ohio, have invented a certain new and useful Improvement in Thermostats, of which the following is a full, clear, and exact description, reference being had to the accompanying drawings.

My invention relates to thermostats for water heating apparatus wherein the flow of gas or other combustion agent is controlled by the temperature of the water which is being heated.

The object of my invention is to provide an improved form of thermostat and connections whereby the fluid fuel valve may be conveniently operated at will to adapt the thermostat for varying temperatures of water.

Reference is had to the accompanying drawings in which—

Figure 1 is an elevation of a water heater with part of the outer casing removed, showing my thermostat in position; Fig. 2 is a longitudinal sectional view of the thermostat; Fig. 3 is a section on the line 3—3 of Fig. 2; Fig. 4 shows my thermostat applied to a hot water reservoir used in a water heating system; Fig. 5 is an elevation, partly in section, of a modified form of thermostat; Fig. 6 is a section upon the line 6—6 of Fig. 5; Fig. 7 is a section upon the line 7—7 of Fig. 5; Fig. 8 is a sectional view on line 8—8 of Fig. 5; Fig. 9 is a plan view, partly in section, showing a further modified form of thermostat; Fig. 10 is a vertical section upon the line 10—10 of Fig. 9 and Fig. 11 is a section upon the line 11—11 of Fig. 9.

The forms of thermostat shown in the drawings are adapted for use either in a dry heat—that is, where the thermostat is directly acted upon by the heat from the burner—or it may be used in connection with the hot-water storage tank used in a water heating system, in which case the thermostat is immersed directly in the water. The constructions of these forms of my thermostat are such that they may be adapted for use in either manner indicated, by a simple change, and thus become convertible thermostats. In Fig. 1, I have shown the thermostat applied to a water heater of the instantaneous type, and when used in this manner the thermostat is subject to a dry heat, that is, it is directly affected by the heat of the burner.

The water heater is of ordinary construction and comprises the outer casing 1 which is provided with a cover and is supported upon a suitable standard. Within the lower portion of the casing 1 is a burner 2 to which fuel is supplied through the pipes 3 and 4. In the upper portion of the casing is a coil of pipe 5 through which the water to be heated flows, said coil being provided with inlet pipes 6 and 7 and an outlet pipe 8. The thermostat, which is represented generally at A, is secured to one side of the casing above the burner and below the coil 5. The water which is admitted through the pipe 6, before it passes through the coil 5, must pass through the thermostat, and by its reaction upon the expansion member thereof operate the valve which admits the gas or other fluid fuel to the burner.

The thermostat is shown in Fig. 2, and the valve-operating part thereof is the same with all forms of thermostat which are shown in this application. The valve-operating part of the thermostat comprises a casing 9 formed with projecting nipples 10 and 11 which are adapted to receive the ends of the pipes 3 and 4 respectively. Passing centrally through the casing is a rod 12 which is connected with the expansion member of the thermostat and is operated thereby so as to move in a longitudinal direction. This rod is suitably supported in a bracket 13 which is carried by the casing. The rod 12 abuts against a screw-threaded member 14 which is secured within a sleeve that is formed integrally with a lever arm 15. This lever 15 is pivoted to the casing at 16 and is formed with a long arm 17 which, at its upper end, has a spherical member 18 through which freely passes a screw 20 that is connected to the under side of the valve 19. This spherical member 18 is held in place by a spring which encircles the screw 20 and abuts against the head thereof and the spherical member 18. The valve 19 is adapted to be seated within the nipple 10 and is held in place so as to properly seat by means of a stem 21 which passes through the central hub of a spider 22 that is secured within the nipple 10.

The lower end of the lever 15 is formed with an arm 23 which engages with a spring 24 held within a depending nipple formed upon the casing 9, the end of the nipple being closed by a suitable cap 25. The action of the spring is to always exert a pressure upon the member 23, thereby tending to rock the lever 15 about its pivot 16 and to cause the arm 17 to hold the valve 19 to its seat. As the rod 12 moves, under the expansion or contraction of the thermostat, it will tend to rock the arm 15 so as to either close the valve 19 or permit said valve to open, according as the expansible member of the thermostat is expanding or contracting.

The screw 14 has upon the end opposite the rod 12 a head which is engaged by prongs 26 carried by the inner end of a rod 27. This rod has in its outer end a slot for the reception of a screw-driver or other tool, so that upon turning the said rod, the screw 14 will be caused to turn, to vary the amount of loose play between the rod 12 and screw 14 as well as the tension with which the spring 24 reacts upon the arm 23. Rod 27 is carried by a cap 28, which engages the end of the casing 9 and is provided with a packing gland 29 through which the rod projects.

It is desirable to arrange the valve-operating part of the thermostat in such manner that the valve 19 is not completely seated, thereby allowing a slight amount of gas to flow to the burner at all times, to form a pilot supply. In order to provide for this supply, a screw 30 projects through the casing 9 from its upper side and bears against the lever arm 17. By regulation of this screw 30, the space between the valve and its seat when the expansion member of the thermostat is in expanded position may be very accurately determined. This feature does away with the by-pass which is ordinarily used in structures of this kind and precludes any danger which might arise from the unwarranted escape or leakage of gas through valve 19.

The thermostat member proper comprises an outer casing 31 which is secured to the inner end of nipple 32 on casing 9. Within casing 31 is a central tube 33 of much smaller diameter than said casing which is likewise secured to the nipple 32. Tube 33 is made of a metal having a high coefficient of expansion so as to contract and expand readily in response to the varying temperature of the water, which passes around it. Within the tube 33 is the inner portion of rod 12, which is made of a metal having a relatively low coefficient of expansion. One end of this rod is suitably connected to the inner end of the tube 33. The outer portion of said rod projects through an aperture in the outer end of nipple 32 and into casing 9, with its outer end in operative relation to the lever 15, as previously explained.

The casing 31 is divided into two parts by a central partition 34 which, as shown in Fig. 3, is curved near its central portion to conform in outline to the tube 33. The water passes through the pipe 6 into the passageway 35 between partition 34 and one side of casing 31. The partition 34 stops short of the end of the casing 31 so as to provide a transverse passageway 36 through which the water may circulate around the end of the partition into passageway 37 on the opposite side of partition 34 from passageway 35 and thence into outlet pipe 7 that leads to the coil 5 within the heater. The water passing through this pipe 7 and coil 5 will be conducted to the pipe 8 and thence to a place of use. It will thus be seen that when a faucet is opened, the cold water first enters the heater by way of the thermostat and at once contracts member 33 to open the valve 19. When the faucet is closed, the heat of the burner speedily raises the temperature of the water in casing 31, causing tube 33 to expand and quickly close valve 19 through the connections described. This dispenses with the use of the complicated constructions which are almost universally employed with heaters of the so-called "instantaneous" type to secure the quick opening and quick closing of the gas valve. To prevent the operation of the thermostat to open the gas valve in case of a leaky faucet or in cases where small amounts of hot water are desired, I provide a by-pass 32$^a$, preferably in the nipple end of the casing 9 and extending between the inlet and outlet connections and provide said part with a valve, which may conveniently be a screw 32$^b$ mounted in the nipple end of the casing, for the purpose of permitting the withdrawal of larger or smaller quantities of water, as may be desired, without opening the gas valve.

In Fig. 4 I have shown my thermostat as applied to the water storage reservoir in water heating systems, and in order to adapt my thermostat to be used interchangeably with such heaters as are shown in Figs. 1 and 4, I have provided the end of the casing 31, as shown in Fig. 2, with a screw-threaded plug 38 which is seated within the cap 39. If this plug 38 be unscrewed and removed, it will allow the water flowing through the casing 31 to pass out of the end of the casing instead of returning, as described above. This will permit the thermostat to be used with a reservoir such as is shown in Fig. 4. The water will be supplied through the pipe 40 and will enter the nipple 32 and will preferably pass through that side of the casing 31 which is represented at 37 in Fig. 3, and will flow out through the end of the casing 31 into the tank 41. As in the previous case, the supply of gas to the burner will be regulated by the expansion and contraction of the tube 31 and the consequent motion of the rod 12. In this case, the opening provided for the exit pipe will be plugged, as shown at 40ᵃ.

In Figs. 5-7, I have shown a modified form of the thermostat. In this form there are two elongated ducts 42 and 43 which are carried by the projecting nipple 32 and are open at their outer ends so as to register with the water openings in the nipple 32 that connect with the inlet and outlet pipes. These ducts are formed between inner and outer walls which are in parallel relation and nearly semi-cylindrical in form. This construction provides a pair of ducts 42 and 43 of the general shape shown in Fig. 6. The inner walls terminate short of the outer walls and are connected by a plate 44 which is of the shape shown to close the circular space within said walls. Rod 12 is connected to plate 44. The outer walls of said ducts are formed by the outer casing and the end of said casing is closed by a removable plug 44ᵃ, rendering this form of thermostat convertible. Surrounding this rod is a covering 12ᵃ of non-corrosive and non heat-conducting material. Near their outer ends these ducts are connected by a transverse passageway around plate 44, so that they communicate one with the other, as indicated at 45 in Figs. 5 and 7. In this manner the water which enters at one side of the nipple 32 will flow through the duct 43, thence through passageway 45 to the duct 42 and out through the opposite side of nipple 32. This form of thermostat may be inserted directly in the hot water reservoir, so that the water in the tank will circulate through ducts 42, 43 and 45 and around the rod 12. The water passing out from the duct 42 through the nipple 32 may be conducted through a suitable pipe to a heater separate from the water reservoir. By removing the plug 44ᵃ, the thermostat may be applied to a heater of the type shown in Fig. 4.

The ducts 42 and 43 in the form of my invention shown in Figs. 5-8 constitute the expansion member of the thermostat. The fact that they have large surfaces and come directly in contact with the water in the tank makes this device very responsive to the temperature of the water in the tank. Moreover, the fact that the cold water also has a large surface upon which it may act makes the thermostat very responsive to the cold water admitted thereto. The thermostat will therefore open the gas valve practically simultaneously with the opening of the hot water faucet and will close the same as soon as the water adjacent to the expansion member is raised to the desired temperature. I provide this form of my invention with a by-pass 32ᶜ controlled by a screw valve 32ᵈ.

In Figs. 9, 10 and 11 a further modification of the thermostat is shown, wherein the outer casing 46 is secured to the nipple 32 in a manner similar to casing 31 in Fig. 2. Within this casing 46 is a tube 47 which corresponds in position and function to tube 32 of Fig. 1 and has within it the rod 12 which is suitably connected to the tube 47 at its inner end. As indicated in Figs. 9-11, a web or fin 48 extends between each side of tube 47 and casing 46, dividing the space therebetween into two ducts or passageways. These webs or fins may be formed integral with tube 47 and be soldered to casing 46. These webs do not extend to the end of the casing 46 but terminate short thereof and each has its end inclined, as indicated at 49, so that the water entering through the nipple 32 will be conducted along one side of the casing and, circulating around the end of the partition formed by the webs or fins, will return through the opposite passageway and pass out through the nipple 32, whence it may be conducted by means of suitable connections to a heater separate from the water reservoir. By removing the plug 46ᵃ, the thermostat may be applied to a heater of the type shown in Fig. 4. The casing 46 and tube 47 together act as the expansion member of the thermostat and, being fixedly secured each to the other by webs or fins 48, they will conjointly act upon the rod 12 to operate the fuel valve. This form of thermostat, as stated, may be inserted into the water in the reservoir of a water-heating system, and, owing to the large surface of the expansion member exposed to the hot and cold water, it is very sensitive and quickly responds to open and close the fuel valve. I provide this form of my invention with a by-pass like that shown in Figs. 5 and 8.

As previously explained and set out, the mechanism by which the gas valve is operated from the thermostatic expansion member is the same for all forms of my thermostat here shown.

In all forms of the thermostat herein described, it will be noted that, when a faucet is opened, cold water comes directly into contact with the expansion member, which will thus insure its immediate response to open the fuel valve to admit an adequate supply of fuel to the burner. When the faucet is closed, the burner will continue to operate until the water which surrounds the expansion member (whether such water be in a tank or in the thermostat casing) attains the standard temperature which is desired and for which the thermostat has been regulated, whereupon the burner supply will be at once reduced to a quantity sufficient for pilot purposes.

It will be seen from the above description that I have provided a thermostat which may be used either in a dry heat or be inserted in the hot water reservoir used in a water heating system, and furthermore, that I have provided a thermostat simple in construction, of few parts, with these parts easy of access, and yet the whole construction produces a thermostat which is very efficient in service. Furthermore, I am enabled, with a thermostat, to secure the quick-opening and quick-closing of the fuel supply valve without the use of complicated constructions which are usually employed with heaters of the instantaneous type.

I claim:—

1. In a thermostat, the combination of a support, inlet and outlet connections carried by said support, channels in the support communicating with said connections respectively, an expansible member carried by said support, a casing surrounding said member and projecting beyond the same, and means dividing the space between the casing and member into longitudinal ducts communicating respectively with said channels, substantially as specified.

2. In a thermostat, the combination of a support having inlet and outlet ports, a rod extending through said support, an expansible member surrounding said rod and operatively connected thereto, a source of fluid supply, and means for circulating a fluid through the inlet port and externally of the expansible member and around the end of said member which is remote from said port and back through the outlet port, a valve, and a connection between said valve and rod.

3. In a thermostat, the combination of a supporting member having inlet and outlet connections on opposite sides thereof, an expansible member carried by said supporting member, a casing carried by said supporting member and inclosing the expansible member, and a partition dividing said casing into a pair of longitudinal ducts or passageways extending lengthwise of the casing and connected at the end remote from said support, said ducts or passageways communicating respectively with the inlet and outlet connections.

4. The combination of a valve casing, an expansible member projecting from said casing, a casing surrounding said expansible member and projecting beyond the end of the same, a partition extending across said casing and terminating short of the projecting end thereof and dividing the casing into a pair of longitudinal passageways and an end passageway, and inlet and outlet connections communicating respectively with said longitudinal passageways.

5. In a thermostat, the combination of an expansible member, a casing inclosing the same and projecting beyond the end of the expansible member, means for dividing the space between said member and said casing into longitudinal passageways, and a removable closure for the projecting end portion of the casing.

6. The combination of a valve casing having a supporting member or nipple for attachment to a heater, inlet and outlet connections communicating with opposite sides of said nipple, ports in said nipple communicating with said connections, an expansible member carried by said nipple and projecting therefrom, a casing carried by said nipple and inclosing the expansible member and projecting therebeyond, means dividing the space between the expansible member and casing into a pair of longitudinal passageways communicating beyond the projecting end of said member, said passageways communicating with said ports respectively, and a removable closure or plug for the projecting end of the casing.

7. The combination of a valve casing having a supporting member or nipple for attachment to a heater, inlet and outlet connections communicating with opposite sides of said nipple, ports in said nipple communicating with said connections, an expansible member carried by said nipple and projecting therefrom, a casing carried by said nipple and inclosing the expansible member and projecting therebeyond, and means dividing the space between the expansible member and casing into a pair of longitudinal passageways communicating beyond the projecting end of said member, said passageways communicating with said ports respectively.

8. In a thermostat, the combination of an expansible member, a casing inclosing the same, a partition dividing said casing into longitudinal passageways, inlet and outlet connections on opposite sides of said partition, and a by-pass between said connections, substantially as specified.

9. In a thermostat, the combination of an expansible member, a casing inclosing the same, a support for said member and said casing, means dividing the space between said casing and member into longitudinal passageways, inlet and outlet connections carried by said support and communicating each with a passageway, and a by-pass in said support between said connections.

10. In a thermostat, the combination of an expansible member, an inlet connection, an outlet connection, connections for circulating fluid from the inlet to the outlet connection in reverse directions longitudinally of said member, and a by-pass extending between the inlet and outlet connections.

11. In a thermostat, the combination of an expansible member, an inlet connection, an outlet connection, connections for circulating fluid from the inlet to the outlet connection in reverse directions longitudinally of said member, a by-pass extending between the inlet and outlet connections, and a valve for controlling said by-pass.

12. The combination of a valve, an expansible member for operating the same, means forming channels extending longitudinally and on opposite sides of said expansible member, connections for circulating fluid through one of said channels, across the end of said member which is remote from the valve and through the other channel.

13. The combination of a valve, an operating member connected therewith, an expansible member comprising a tube connected to said rod, means forming channels extending longitudinally on opposite sides of said expansible member and communicating at the end which is remote from the valve, and connections for circulating fluid through said channels.

In testimony whereof, I hereunto affix my signature in the presence of two witnesses.

JOHN F. WILLIAMS.

Witnesses:
J. B. HULL,
BRENNAN B. WEST.